United States Patent
Hicks et al.

(10) Patent No.: US 12,393,497 B2
(45) Date of Patent: Aug. 19, 2025

(54) RESILIENT ERROR HANDLING THROUGH MULTIPATHING CODE

(71) Applicant: International Business Machines Corporation, Armonk, NY (US)

(72) Inventors: Andrew C. M. Hicks, Highland, NY (US); Desmond Fitzpatrick, Ossining, NY (US); Michael Terrence Cohoon, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 18/528,902

(22) Filed: Dec. 5, 2023

(65) Prior Publication Data

US 2025/0181461 A1   Jun. 5, 2025

(51) Int. Cl.
  *G06F 11/00* (2006.01)
  *G06F 11/14* (2006.01)

(52) U.S. Cl.
  CPC ................ *G06F 11/1489* (2013.01)

(58) Field of Classification Search
  CPC .................................. G06F 11/1489
  USPC ......................................... 714/17
  See application file for complete search history.

(56) References Cited

U.S. PATENT DOCUMENTS

| | | |
|---|---|---|
| 5,119,488 A | 6/1992 | Takamatsu |
| 5,269,017 A | 12/1993 | Hayden |
| 6,625,747 B1 | 9/2003 | Tawil |
| 6,658,656 B1 * | 12/2003 | Thompson .......... G06F 11/1489 |
| | | 717/122 |
| 6,874,138 B1 | 3/2005 | Ziegler et al. |
| 7,536,603 B2 | 5/2009 | Coldicott |
| 7,546,588 B2 | 6/2009 | Dickenson |
| 7,668,981 B1 | 2/2010 | Nagineni et al. |
| 8,527,743 B2 * | 9/2013 | Genta ................ G06F 9/327 |
| | | 712/241 |
| 8,938,644 B2 | 1/2015 | Clark |
| 9,563,538 B2 | 2/2017 | Bestgen |
| 9,733,912 B2 | 8/2017 | Adl-Tabatabai |
| 9,847,933 B2 | 12/2017 | Decusatis |

(Continued)

FOREIGN PATENT DOCUMENTS

| | | |
|---|---|---|
| CN | 102262537 B | 10/2014 |
| CN | 106547520 B | 5/2021 |

OTHER PUBLICATIONS

Appendix P, List of IBM Patents or Patent Applications Treated as Related, Apr. 2, 2024, 2 pages.

(Continued)

*Primary Examiner* — Jason B Bryan
(74) *Attorney, Agent, or Firm* — CANTOR COLBURN LLP; Randy Tejeda (57) ABSTRACT

A multipathing code package including multiple code sections is provided. The multipathing code package includes at least different first and second versions of a particular code section among the multiple code sections. Processing circuitry of a data processing system executes the multipathing code package. Execution of the multipathing code packages includes executing a first version of the particular code section. Based on detecting an occurrence of an execution failure in the first version of the particular code section, the processing circuitry rewinds execution and replays the particular code section through execution of the second version.

15 Claims, 4 Drawing Sheets

(56) References Cited

U.S. PATENT DOCUMENTS

| | | |
|---|---|---|
| 9,904,585 B1 | 2/2018 | Islam |
| 10,389,639 B1 | 8/2019 | Matthews |
| 10,990,481 B2 | 4/2021 | Borlick |
| 2006/0191014 A1 | 8/2006 | Zvi |

OTHER PUBLICATIONS

Cohoon et al., "Modification-Based Multipathing Code", U.S. Appl. No. 18/538,294, filed Dec. 13, 2023, 20 pages.

Cohoon et al., "Multipathing Code Execution Based on Failure Severity Background", U.S. Appl. No. 18/538,166, filed Dec. 13, 2023, 21 pages.

* cited by examiner

RESILIENT ERROR HANDLING THROUGH MULTIPATHING CODE

BACKGROUND OF THE INVENTION

The present invention relates in general to data processing, and more specifically, to techniques for error recovery in data processing systems. Still more particularly, the present invention relates to resilient error handling through multipathing code.

Data processing systems and applications have become increasingly complex, making them susceptible to errors that can render the system unstable or unusable. This vulnerability to errors is particularly detrimental in critical core systems in which resiliency and availability are paramount. Traditional error handling approaches rely on exception detection and recovery or retry logic to address errors. However, these conventional error handling approaches can be ineffective if the data processing system handles each repeated instance of the same error in the same way, as the error is likely to repeat.

SUMMARY OF THE INVENTION

In view of the foregoing drawbacks of conventional error handling techniques, the inventions disclosed herein employ multipathing code to provide multiple execution paths for error resolution. The disclosed inventions provide a more resilient approach to error handling by allowing a data processing system, in case of an error, to rewind to the beginning of an execution path experiencing the error and replay the task again using a different execution path.

In at least one embodiment, a multipathing code package including multiple code sections is provided. The multipathing code package includes at least different first and second versions of a particular code section among the multiple code sections. Processing circuitry of a data processing system executes the multipathing code package. Execution of the multipathing code packages includes executing a first version of the particular code section. Based on detecting an occurrence of an execution failure in the first version of the particular code section, the processing circuitry rewinds execution and replays the particular code section through execution of the second version.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION OF ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
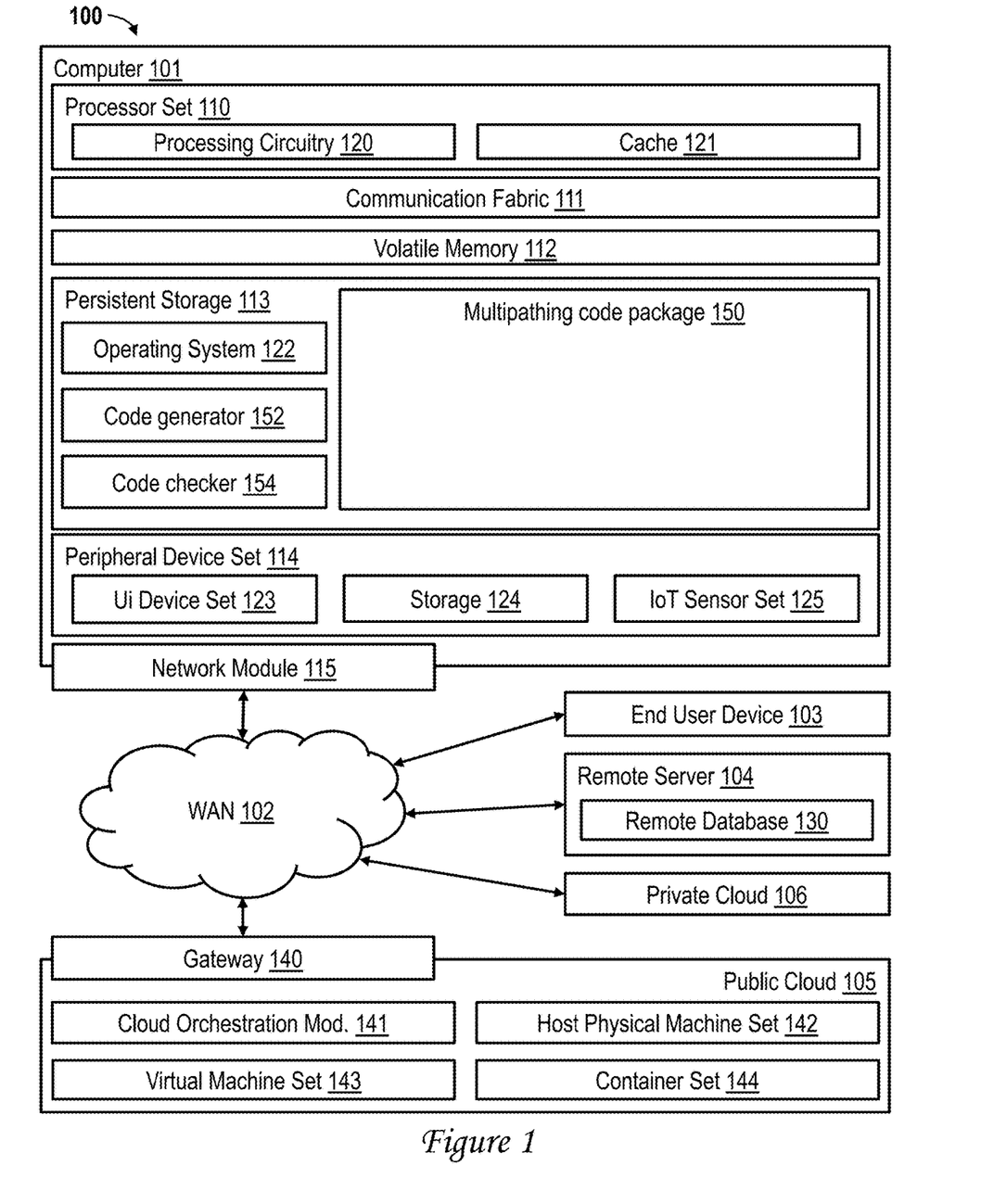
FIG. 1 is a high-level block diagram of an exemplary data processing environment in accordance with one or more embodiments.

Computing environment 100 contains an example of an environment for the execution of at least some of the computer code involved in performing the inventive methods, such as multipathing code package 150, code generator 152, and code checker 154. In addition to this computer code, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, multipathing code package 150, code generator 152, and code checker 154, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in multipathing code package 150, code generator 152, and/or code checker 154 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in blocks 150, 152, and 154 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet-of-Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the Internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Those of ordinary skill in the art will appreciate that the architecture and components of a data processing environment can vary between embodiments. Accordingly, the exemplary computing environment 100 given in FIG. 1 is not meant to imply architectural limitations with respect to the claimed invention.

Figure 2:
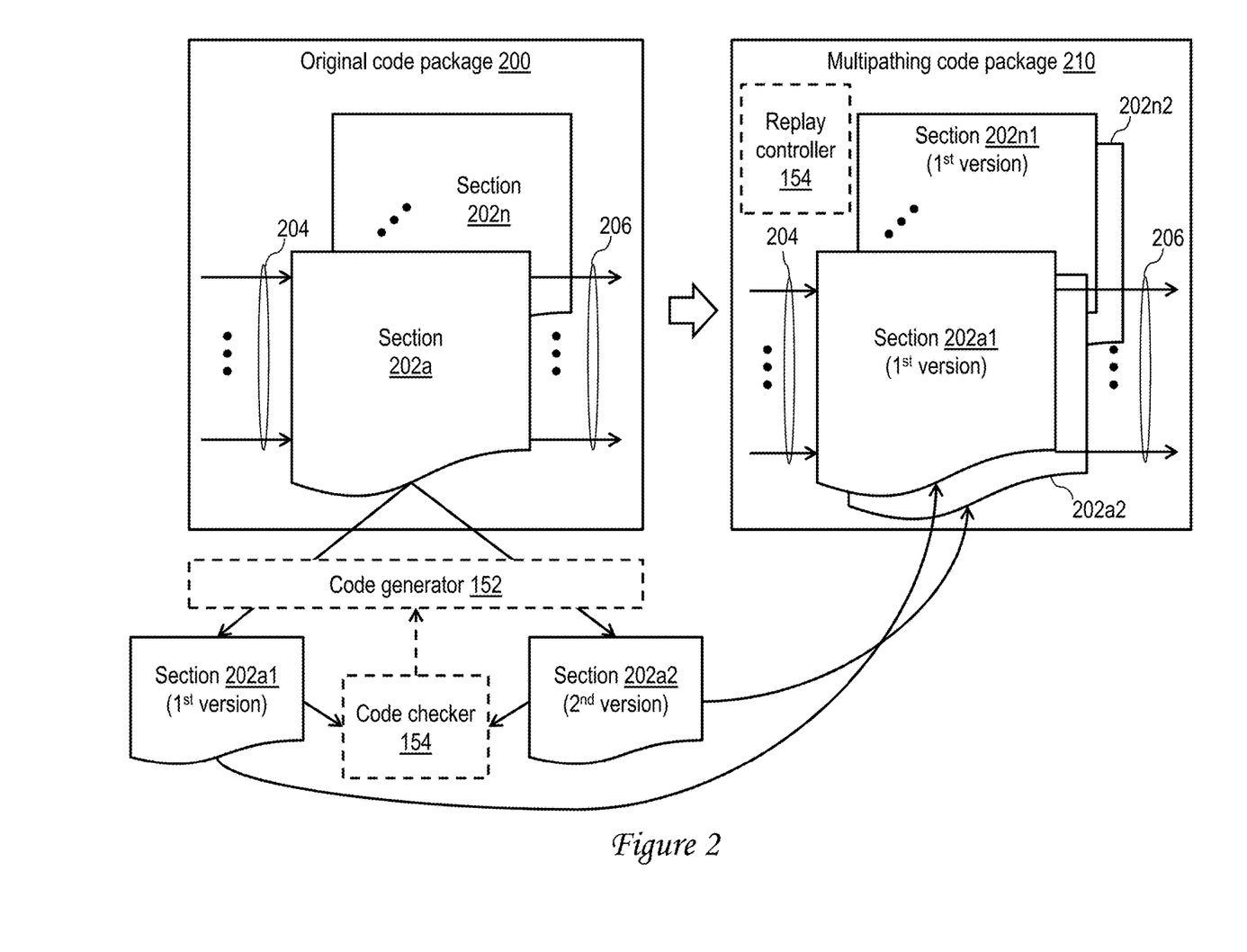
FIG. 2 is a data flow diagram illustrating the generation of multipathing code in accordance with one or more embodiments.

Referring now to FIG. 2, there is depicted a process flow diagram illustrating the generation of multipathing code in accordance with one or more embodiments. In the depicted embodiment, an original code package 200 may initially be utilized in a computing environment, such as computing environment 100 of FIG. 1, to provide an associated set of functions. In some cases, original code package 200 may provide mission-critical or near-zero-downtime functionality essential to commerce (e.g., stock market trading platform), life and/or safety (e.g., healthcare management platform or industrial safety monitoring platform), scientific endeavors, voting (e.g., election management platform), cyber security, or other applications. Original code package 200 can be, for example, a virtual machine, containerized application, application, or the like. In a typical case, original code package 200 includes, or can be logically evaluated as including, a plurality of code sections 202a to 202n. Each code section has a respectively input set 204 including one or more inputs and may further have an output set 206 including one or more outputs. In various embodiments, a section 202 may be, for example, a subroutine, a function, an object, an object container, a library, a script, or the like. In various embodiments, sections 202a to 202n may or may not be defined by the programming language or language constructs of the programming language in which original code package 200 is written. In some embodiments, all code of original code package 200 forms part of at least one of sections 202a-202n; in other embodiments, at least some code of original code package 200 is not included in any of sections 202a-202n, but simply bridges execution between sections 202.

FIG. 2 further illustrates the provision of multiple different versions (e.g., including versions 202a1 and 202a2) of each of one or more sections 202a-202n of original code package 200. Each such version 202a1, 202a2, etc. performs the same function and has the same input set 204 and output set 206 (if applicable) of the corresponding section 202a. In some cases, multiple different versions of each of sections 202a-202n are provided; in other cases, multiple different versions of only selected ones of sections 202a-202n are provided, for example, those sections 202 in which execution failures have been detected and/or those sections 202 in which execution failures are likely due to the content and/or complexity of the constituent code.

In some embodiments, the various different versions of a code section can be written in two or more different programming languages (e.g., compiled languages, interpreted languages, scripts, etc.); in other embodiments, the various different versions can be written in the same programming language. In some cases, one version, such as version 202a1 (which is a first version of section 202a), can be identical to original section 202a and can be, for example, legacy code; in other cases, all of the versions 202a1, 202a2, etc. can be different from original section 202a. In some cases, the various different version of a section 202 can be generated by different compilations of common source code based on different compilation parameters that control, for example, code optimizations that leverage out-of-order instruction or other capabilities of processing circuitry 120 or the insertion of no-op instructions, wait states, or other execution delays within the code version.

In some cases, one or more of versions 202a1, 202a2, etc. can be created by a human programmer without the aid of code generator 152. In other cases, one or more of versions 202a1, 202a2, etc. can be created by code generator 152, which can include, for example, a compiler, an automated code converter, and/or a generative artificial intelligence (AI) agent. A code checker 154 may optionally be employed to check versions 202a1, 202a2, etc. For example, in some embodiments, code checker 154 can check that different versions 202a1, 202a2, etc. perform the same function(s) and have the same input set 204 and output set 206 (if any) as the corresponding section 202a of original code package 200. Alternatively or additionally, code checker 154 can verify whether the complexity of versions 202a1, 202a2, etc. satisfies (e.g., is less than) a target complexity metric (e.g., a Halstead complexity metric or cyclomatic complexity metric), and if not, can initiate generation of an additional version by code generator 152 that satisfies the target complexity metric.

Following the provision of multiple versions of each relevant section 202a-202n of original code package 200, the versions are collected within a multipathing code package 210. Multipathing code package 210 can be, for example, a virtual machine, a containerized application, an application, or the like. In the illustrated example, multipathing code package 210 includes at least two versions of section 202a (i.e., versions 202a1 and 202a2) and at least two versions of section 202n (i.e., versions 202n1 and 202n2). In at least some embodiments, multipathing code package 210 additionally includes a replay controller 154, which is code that, based on occurrence of an execution failure in one version of a section 202, automatically rewinds execution and initiates replay of an alternative version of the failing code section 202.

Figure 3:
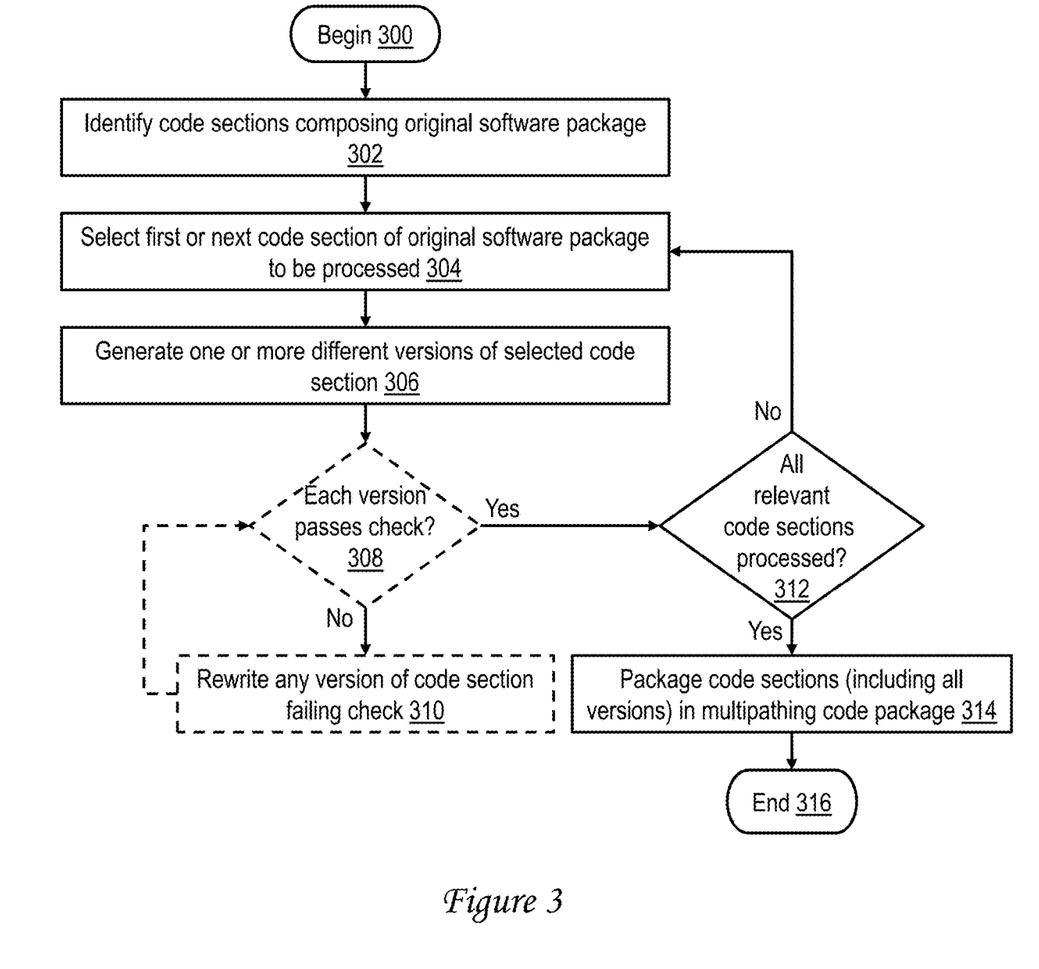
FIG. 3 is a high-level logical flowchart of an exemplary method of generating multipathing code in accordance with one or more embodiments.

With reference now to FIG. 3, there is illustrated a high-level logical flowchart of an exemplary method of generating multipathing code in accordance with one or more embodiments. To promote understanding, the illustrated process is described with reference to the embodiments depicted in FIG. 2.

The method of FIG. 3 begins at block 300 and then proceeds to block 302, which illustrates a step of identifying various different code sections 202 composing an original code package 200. As noted above, the code sections 202 can be identified by a human programmer and/or by other program code, such as code generator 152. At block 304, a first or next code section 202 identified at block 302 is selected for processing. As indicated at block 306, the processing includes generating one or more additional versions of the selected code section 202, such that multiple different versions (e.g., versions 202a1, 202a2, etc.) of the code section 202 are provided. As noted above, the different versions of the selected code section 202 can be generated by a human programmer and/or by program code, such as code generator 152.

At block 308, the various versions of the selected code section can optionally be checked, for example, for consistency with the functions and input set 204 and output set 206 (if any) of the original code section 202 and/or for satisfaction of (i.e., a check of whether the complexity is less than) a desired complexity metric (e.g., a Halstead complexity metric or cyclomatic complexity metric). In some embodiments, the check(s) illustrated at block 308 can be performed in an automated fashion by code checker 154. As indicated at block 310, a human programmer and/or code generator 152 can rewrite any version of the selected code section 202 that fails the check made at block 308 to ensure that each version of the selected code section 202 incorporated into the multipathing code package 210 passes the check(s) made at block 308.

At block 312, a determination is made whether or not all code sections 202 of original code package 200 that are to be processed have been processed. For example, in some embodiments, the determination depicted at block 312 can simply check whether or not all sections of original code package 200 have been processed. In other embodiments, the determination made at block 312 can check whether or not all code sections 202 having greater than a given complexity metric (e.g., Halstead complexity metric or cyclomatic complexity metric) have been processed. In response to a determination at block 312 that not all relevant code sections 202 have been processed, the process returns to block 304 and proceeds iteratively. If, on the other hand, a determination is made at block 312 that all relevant code sections have been processed, a human programmer and/or program code packages all of the sections (including the multiple versions 202a1, 202a2, etc.) into multipathing code package 210 (block 314). As depicted in FIG. 2, multipathing code package 210 may additionally include a replay controller 154. Following block 314, the process of FIG. 3 ends at block 316.

Figure 4:
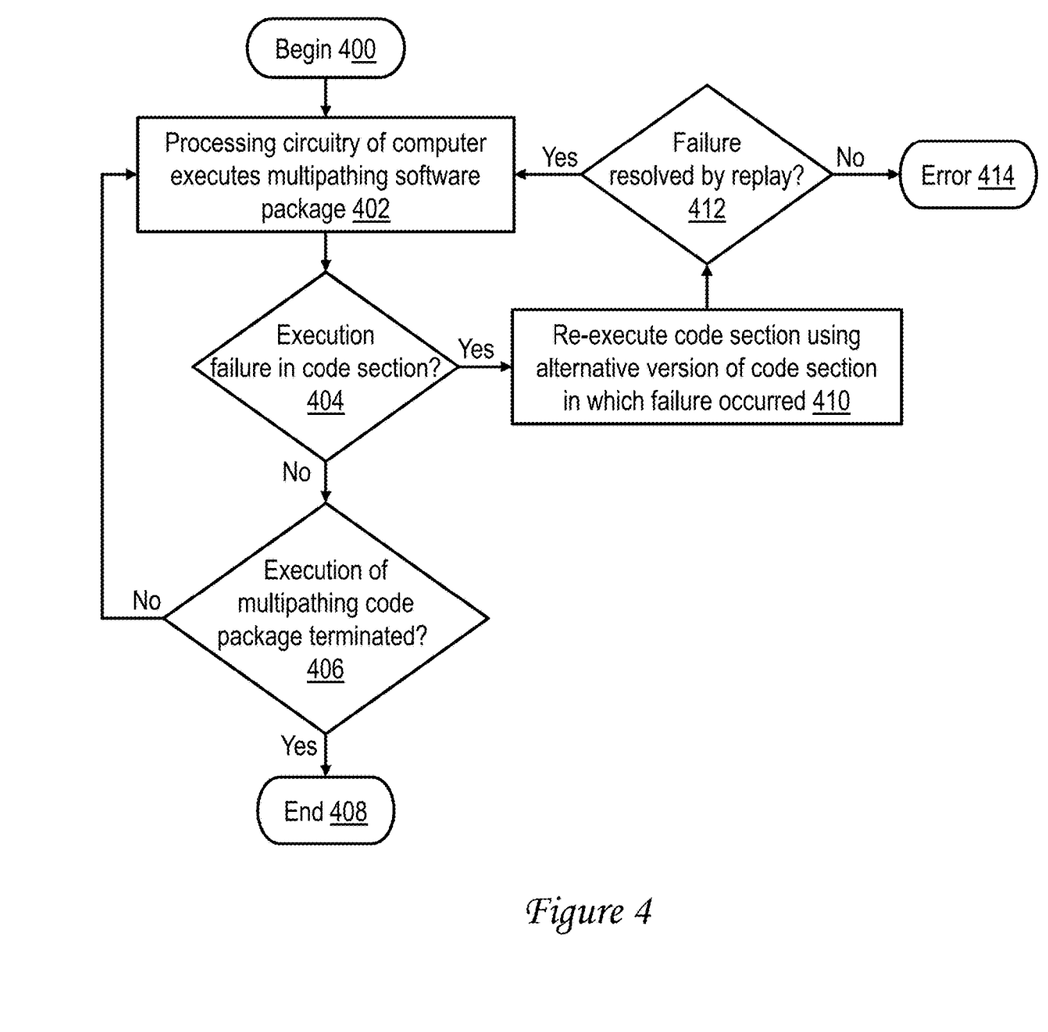
FIG. 4 is a high-level logical flowchart of an exemplary method of executing multipathing code in accordance with one or more embodiments.

Referring now to FIG. 4, there is depicted a high-level logical flowchart of an exemplary method of executing multipathing code, such as multipathing code package 210 of FIG. 2, in accordance with one or more embodiments. Multipathing code package 210 can be executed, for example, by processing circuitry 120 of a computer 101 as depicted in FIG. 1.

The process of FIG. 4 begins at block 400 and then proceeds to block 402, which illustrates processing circuitry 120 of computer 101 initiating execution of multipathing software package 210. During execution of the multipathing software package 210, program code (e.g., replay controller 154 or operating system 122) monitors for an occurrence of an execution failure in a code section 202. As will be appreciated by those skilled in the art, an execution failure may occur for one or more of a variety of reasons, for example, due to idiopathic timing issues, race conditions between code sections 202 or workloads, scheduling of garbage collection operations, and/or concatenation of asynchronous events. In response to a negative determination at block 404, the process proceeds to block 406, which illustrates a further determination of whether or not execution of multipathing code package 210 has been terminated. In response to a determination at block 406 that execution of multipathing code package 210 has not been terminated, the process returns to block 402 and proceeds iteratively. If, however, a determination is made at block 406 that execution of multipathing code package 210 has been terminated, execution of multipathing code package 210 ends at block 408.

Returning to block 404, in response to a determination at block 404 that an execution failure in a code section 202 has occurred, the process proceeds to block 410, which illustrates program code, such as replay controller 154 or operating system 122, rewinding execution and re-executing the code section 202 in which the execution failure was detected utilizing an alternative version of the section 202. For example, based on detection of an execution failure in version 202a1 of section 202, program code may initiate execution of version 202a2 instead of version 202a1. Thus, multipathing code package 210 exhibits a play, fail, re-play model of code resilience. At block 412, program code, such as replay controller 154 or operating system 122, determines whether or not the execution failure detected at block 404 is resolved by replaying the failing code section 202 utilizing a different version of the code section 202. In many cases in which the execution failure is caused by a concatenation of conditions, a race condition, or other timing issue, replay utilizing a different version of the failing code section 202 will resolve the execution failure and enable the code section 202 to be executed successfully. In response to a determination at block 412 that the execution failure is resolved, the process returns to block 402 and continues iteratively. If, however, replaying one or more alternative versions of the code section 202 in which an execution failure was detected does not resolve the execution failure, execution of multipathing code package 210 terminates with an error condition at block 414.

As has been described, in at least one embodiment, a multipathing code package including multiple code sections is provided. The multipathing code package includes at least different first and second versions of a particular code section among the multiple code sections. Processing circuitry of a data processing system executes the multipathing code package. Execution of the multipathing code packages includes executing a first version of the particular code section. Based on detecting an occurrence of an execution failure in the first version of the particular code section, the processing circuitry rewinds execution and replays the particular code section through execution of the second version.

The present invention may be implemented as a method, a system, and/or a computer program product. The computer program product may include a storage device having computer-readable program instructions (program code) thereon for causing a processor to carry out aspects of the present invention. As employed herein, a "storage device" is specifically defined to include only statutory articles of manufacture and to exclude signal media per se, transitory propagating signals per se, and energy per se.

Aspects of the present invention are described herein with reference to flowchart illustrations and/or block diagrams that illustrate the architecture, functionality, and operation of possible implementations of systems, methods, and computer program products according to various embodiments. It will be understood that each block of the block diagrams and/or flowcharts and combinations of blocks in the block diagrams and/or flowcharts can be implemented by special purpose hardware-based systems and/or program code that perform the specified functions. While the present invention has been particularly shown as described with reference to one or more preferred embodiments, it will be understood by those skilled in the art that various changes in form and detail may be made therein without departing from the spirit and scope of the invention.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms and that multiple of the disclosed embodiments can be combined. Lastly, the use of a singular term, such as, but not limited to, "a" is not intended as limiting of the number of items.

What is claimed is:

1. A method of executing program code in a data processing system, the method comprising:
providing a multipathing code package including multiple code sections, wherein the multipathing code package includes at least different first and second versions of a particular code section among the multiple code sections;
executing, by processing circuitry of a data processing system, the multipathing code package, wherein the executing includes executing a first version of the particular code section; and based on detecting an occurrence of an execution failure in the first version of the particular code section, the processing circuitry rewinding execution and replaying the particular code section through execution of the second version, wherein the providing includes:
employing a legacy version of the particular code section as the first version; and
generating the second version from the legacy version, wherein the second version is
written in a different programming language than the legacy version.

2. The method of claim 1, wherein the first and second versions include differing wait states.

3. The method of claim 1, wherein the providing includes compiling the different first and second versions from common source code.

4. The method of claim 1, wherein the providing includes generating the first version such that the first version has a complexity less than a selected complexity metric.

5. The method of claim 1, wherein the providing includes providing, in the multipathing code package, multiple versions for at least each code section having greater than a threshold complexity metric.

6. A program product, comprising:
a non-transitory computer-readable storage medium; and
program code stored within the non-transitory computer-readable storage medium and executable by processing circuitry of a data processing system to cause the data processing system to perform:
providing a multipathing code package including multiple code sections, wherein the multipathing code package includes at least different first and second versions of a particular code section among the multiple code sections;
executing the multipathing code package, wherein the executing includes executing a first version of the particular code section; and
based on detecting an occurrence of an execution failure in the first version of the particular code section, rewinding execution and replaying the particular code section through execution of the second version,
wherein the providing includes:
employing a legacy version of the particular code section as the first version; and
generating the second version from the legacy version, wherein the second version is
written in a different programming language than the legacy version.

7. The program product of claim 6, wherein the first and second versions include differing wait states.

8. The program product of claim 6, wherein the providing includes compiling the different first and second versions from common source code.

9. The program product of claim 6, wherein the providing includes generating the first version such that the first version has a complexity less than a selected complexity metric.

10. The program product of claim 6, wherein the providing includes providing, in the multipathing code package, multiple versions for at least each code section having greater than a threshold complexity metric.

11. A data processing system, comprising: processing circuitry;
a storage device communicatively coupled to the processing circuitry; and
program code stored within the storage device and executable by the processing circuitry of the data processing system to cause the data processing system to perform:
providing a multipathing code package including multiple code sections, wherein the multipathing code package includes at least different first and second versions of a particular code section among the multiple code sections;
executing the multipathing code package, wherein the executing includes executing a first version of the particular code section; and
based on detecting an occurrence of an execution failure in the first version of the particular code section, rewinding execution and replaying the particular code section through execution of the second version,
wherein the providing includes:
employing a legacy version of the particular code section as the first version; and
generating the second version from the legacy version, wherein the second version is written in a different programming language than the legacy version.

12. The data processing system of claim 11, wherein the first and second versions include differing wait states.

13. The data processing system of claim 11, wherein the providing includes compiling the different first and second versions from common source code.

14. The data processing system of claim 11, wherein the providing includes generating the first version such that the first version has a complexity less than a selected complexity metric.

15. The data processing system of claim 11, wherein the providing includes providing, in the multipathing code package, multiple versions for at least each code section having greater than a threshold complexity metric.

* * * * *